Patented Mar. 3, 1942

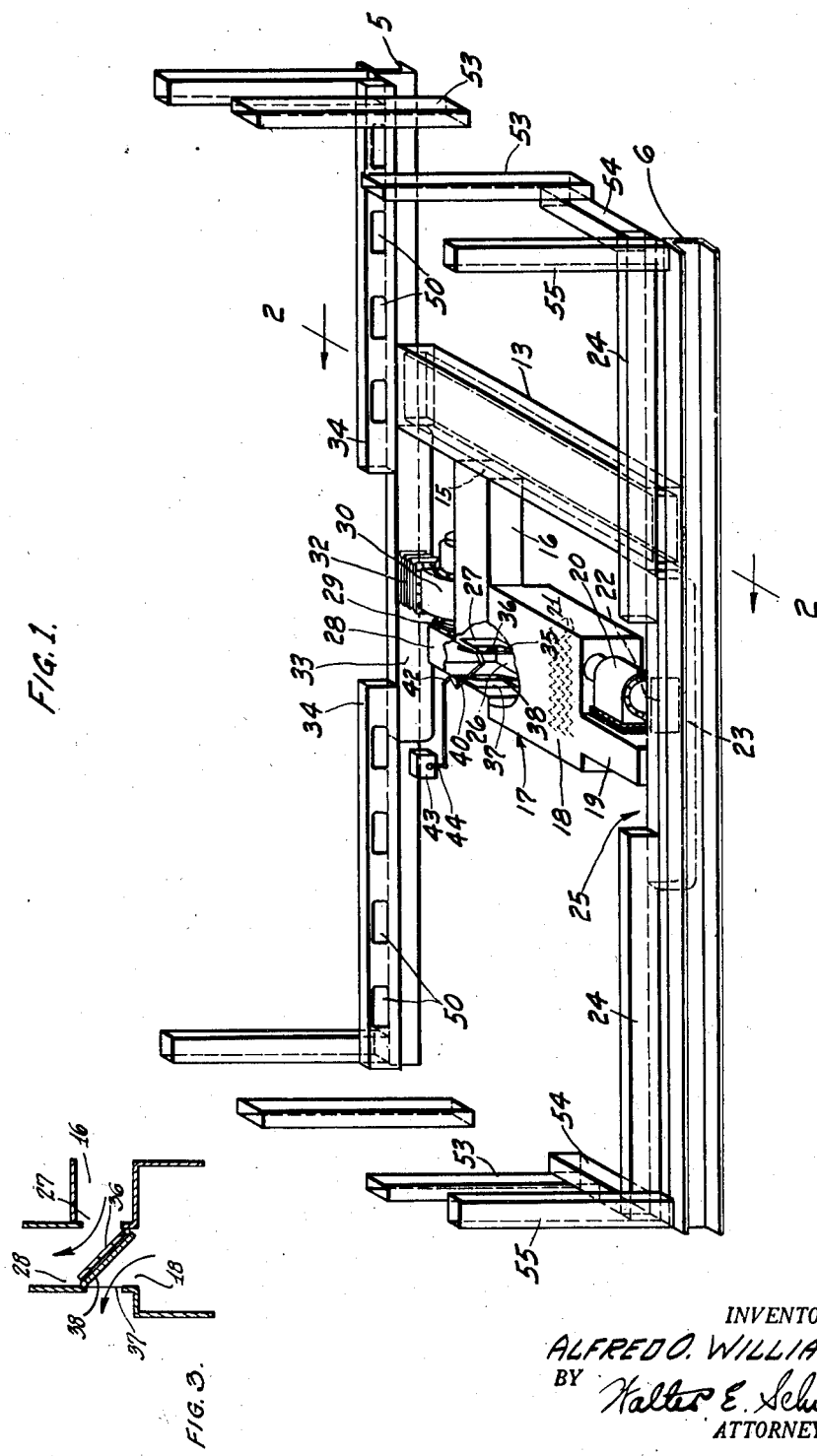

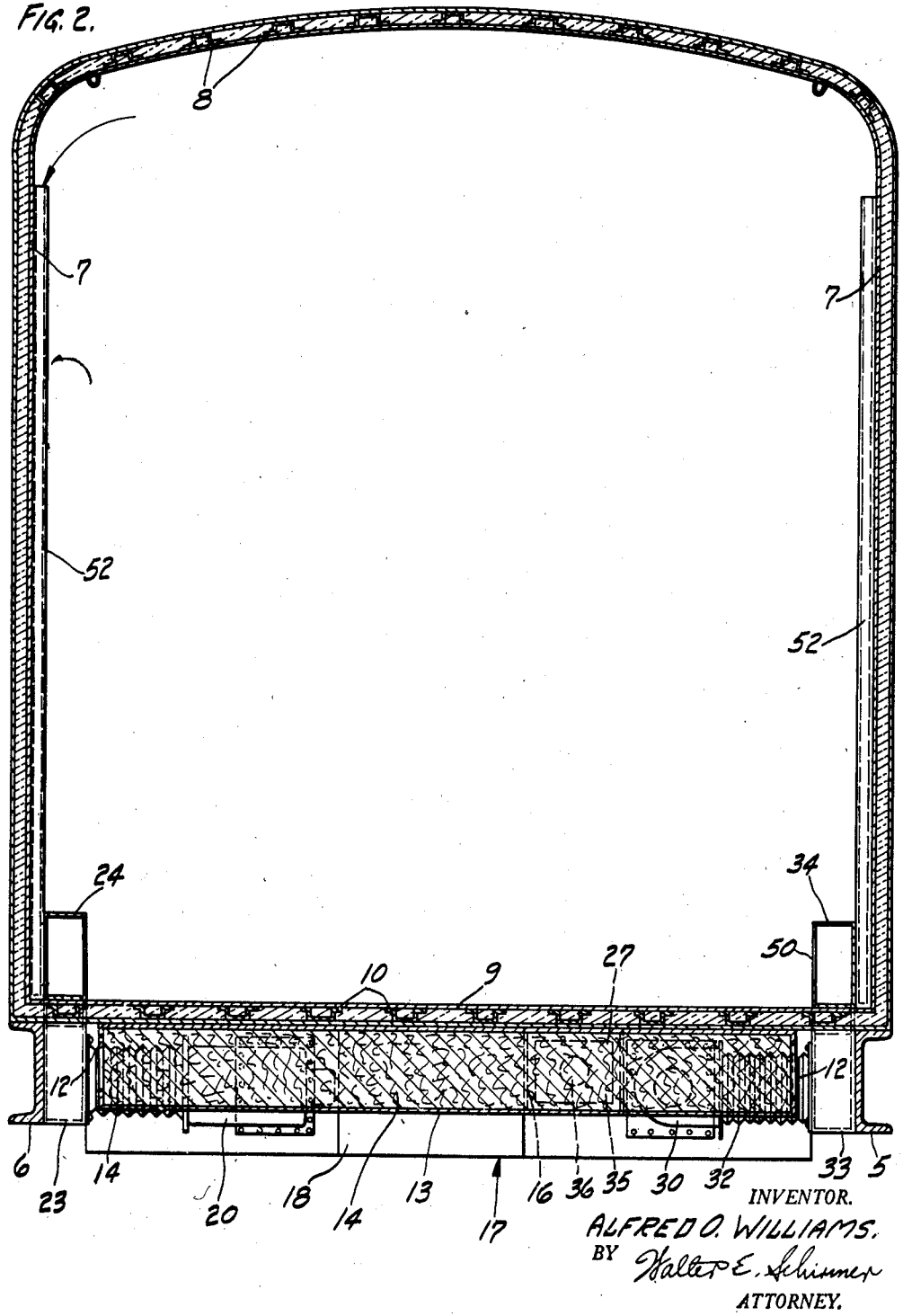

2,275,120

UNITED STATES PATENT OFFICE 2,275,120

AIR CONDITIONING SYSTEM FOR RAIL VEHICLES

Alfred O. Williams, Battle Creek, Mich., assignor to Clark Equipment Company, Battle Creek, Mich., a corporation of Michigan Application June 30, 1938, Serial No. 216,673

12 Claims. (Cl. 98—10)

This invention relates to air conditioning systems, and more particularly is directed to an air conditioning system for a rail vehicle or the like.

It is a primary object of the present invention to provide a system in which the interior of the car is maintained under a slight pressure to prevent infiltration of outside unconditioned air, and to provide a barrier for the entrance of such air when the doors are opened. In addition, by the use of a pressure system it is possible to keep out dust and dirt to an appreciable extent due to the fact that no air enters the car through window cracks, door openings or the like.

In providing for a system of this type, one of the main features is the employment of a pair of blowers, one of which has a higher capacity than the other. The blower with the larger capacity is provided for forcing air into the car through suitable grill means located adjacent the seats in the side walls of the car or at the roof. The blower of smaller capacity is employed for withdrawing air from the interior of the car and for forcing this air over suitable conditioning means toward the inlet of the larger blower. It will thus be apparent that more air is forced into the car than is exhausted therefrom, and consequently mechanism is provided for making up the deficiencies by the use of a fresh air inlet, which is controlled in such manner as to supply the deficient amount of air even under conditions where all of the return air drawn through the exhaust blower is redirected toward the inlet blower.

Another feature of the present invention is the utilization of the heat produced in the resistors of an electrically driven unit, as a means for tempering air to be introduced in the car during cold weather with the employment of the return air as a means for cooling these resistors during hot weather with the return air being then discharged from the vehicle and not again entering the air conditioning system.

Another feature of the present invention is the provision of a transversely extending duct beneath the car body which may be filled with suitable filtering material, and which has lateral openings at opposite ends thereof forming a filtered fresh air inlet for the air conditioning system, which also is disposed beneath the car floor, this inlet entering the system at a point intermediate the two blowers and suitably controlled by means of a damper or the like whereby the amount of air admitted therethrough above a predetermined minimum is definitely regulated.

Intermediate the two blowers there is also provided an outlet port controlled by a suitable damper which is connected for conjoint movement with the fresh air inlet damper in such manner that a predetermined amount of air will be admitted to the fresh air inlet regardless of the position of the dampers. In one extreme limiting position of the dampers, all of the air being drawn through the exhaust blower plus the quantity of fresh air necessary to make up the deficiency between the blower capacities is transmitted to the large blower with no air passing through the exhaust port. In the opposite limiting position, the two dampers overlap each other in such manner as to close off the return air from the exhaust blower so that all of this air passes through the outlet port, and entirely fresh air is taken into the large blower. In the intermediate positions of the dampers, the quantity of fresh air and return air is relatively proportioned, depending upon temperature conditions desired within the car as compared with outside temperatures.

Another feature of the present invention resides in the provision of port means formed in the structural part of the car forming inlets for the conditioned air with additional port means designed to provide for withdrawal of air from within the car to the conditioning system. In a preferred form of the invention the construction is so arranged that the fresh air is admitted adjacent the floor on one side of the car, and is withdrawn adjacent the upper part of the opposite side of the car. However, this arrangement is optional as it is also contemplated within the scope of the present invention to provide for admitting air to the car adjacent the floor on opposite sides thereof and withdrawing the air from adjacent the roof through monitors or tubular side frame members.

Another feature of the present invention resides in the provision of a simplified air conditioned unit which is easily assembled, which is economic in design and operation, and which is easily controlled by means of a single temperature responsive member. This, in connection with the use of blowers of different capacities as stated, provides a novel type of air conditioning system especially designed for electrically operated rail vehicles.

Other objects and advantages will appear more fully from the following detailed description, which, taken in conjunction with the accompanying drawings, will disclose to those skilled in the art the particular construction and operation of a preferred form of the present invention.

In the drawings:

Figure 1 is a perspective diagrammatic view showing the air conditioning system embodying the present invention;

Figure 2 is a transverse sectional view through a portion of the car body, substantially as indicated on line 2—2 of Figure 1, and showing the relative positions of the various parts of the air conditioning system; and Figure 3 is a diagrammatic plan view of the mixing chamber and damper control mechanism.

Referring now in detail to the drawings, in Figure 1 there is diagrammatically indicated a car body mounted on suitable sill members 5 and 6 running longitudinally of the car beneath the floor thereof. The car wall is indicated generally at 7 and preferably comprises an inner and outer member spaced apart by suitable longitudinally extending spacers, as indicated at 8. Suitable insulation is provided between the two wall sections for preventing transmission of heat therethrough. The floor 9 preferably is also formed by means of two spaced floor portions spaced apart by the spacers 10.

As is indicated clearly in Figure 2, the side rails or beams 5 extend beneath the outer edges of the walls 7, and do not in any manner interfere with the opposite inlets 12 of the transversely extending duct member 13 which extends between the side rails 5 and 6 transversely of the car, and which is preferably filled with loosely packed filtering material such as indicated at 14, which may be wire mesh, cloth screens, or any other suitable means that will remove minute particles of dirt and dust from the air. The duct 13 is provided intermediate its ends with a normally extending outlet opening 15 which opens into a longitudinally extending duct 16 communicating with the general air conditioning system indicated in its entirety by the numeral 17.

The air conditioning system indicated at 17 includes a chamber 18 which preferably encloses the resistor units diagrammatically shown at 21 associated with the electrical driving means of the vehicle. At one end the chamber 18 is provided with an extension 19 communicating with the outlet of a blower 20, which in turn has its inlet 22 connected to the longitudinally extending duct 23 which has the opposite end portions thereof communicating with the longitudinal ducts 24 extending along the side of the car on opposite sides of the door opening, which is indicated generally at 25.

It is to be understood that the present air conditioning system is proposed for use in connection with electric rail vehicles, such as street cars, elevated trains and the like which are provided with door openings located centrally of the sides thereof, and it is contemplated that the present system will be installed below the floor of the car substantially beneath the door openings.

The outlet of the chamber 18 is indicated at 26, and is disposed adjacent the fresh air outlet opening 27 of the duct 16. The openings 26 and 27 enter into a common passageway 28 connected to the inlet 29 of a second blower 30 which has a flexible outlet connection 32 to a duct 33 corresponding to the duct 23 and provided at opposite ends with communicating openings into the longitudinally extending ducts 34.

Each of the blowers 20 and 30 is preferably operated by an electric motor or in any other suitable manner, and the speeds are definitely controlled, the blower 20 preferably having the capacity of approximately 900 cubic feet per minute, while the blower 30 has a capacity of approximately 1200 cubic feet per minute. Any other relative ratios of capacities may be employed, depending upon the size of the car, the pressure desired therein, and the leakage factor of the car construction produced by window openings, door cracks and the like.

The fresh air outlet opening 27 into the passageway 28 is preferably controlled by a damper 35 which is hinged along one vertical edge to swing toward and away from the opening 27. The damper 35 preferably has a central aperture 36 so that even with the damper in closed position against the opening 27, a predetermined quantity of air will pass through the aperture 36 from the duct 16.

Directly opposite the opening 27 is an exhaust opening 37 formed in the common passageway 28 and controlled by an imperforate damper 38 which is hinged along a vertical edge opposite to the damper 35, and is adapted to swing toward and away from the opening 37 to control the amount of air exhausted therethrough.

The two dampers 35 and 38 are connected for conjoint movement by the link 40 which in turn, through the bell crank 42 is connected to a suitable temperature responsive mechanism 43 having the actuating arm 44 projecting therefrom. It will be apparent that as the damper 38 is swung open by the mechanism 43, the damper 35 will likewise be swung open, and in the open limiting position the dampers 35 and 38 overlap in such manner as to close the aperture 36 and to prevent any air from the chamber 18 entering the passageway 28. In this position therefore, the entire supply of air to the blower 30 is drawn through the transverse duct 13 and the duct 16, while the entire amount of air discharged into the chamber 18 is exhausted through the opening 37.

The ducts 34 are preferably provided with grilled openings 50 in the lateral inner walls thereof, which openings admit the air discharged by the blower 30 into the interior of the car. The walls 7 of the car preferably have windows formed therein between which are vertically extending tubular members as indicated at 52 in Figure 2, which may be provided with exhaust openings in the inner walls thereof whereby air may be withdrawn from the interior of the car therethrough down into the ducts 24.

As shown in Figure 1, the ends of the car are provided with two vertical supporting members 53 framing the door opening at the end of the car, and these members may be made hollow to provide additional exhaust air passageways communicating at their lower ends through the ducts 54 with the ducts 24. The corners of the car may also be provided with vertical tubular supporting members 55 communicating with the ducts 24 in a similar manner, or if desired, a roof monitor may be provided which communicates through any of the vertically extending tubular supporting members with the ducts 24 to return air from the interior of the car to the air conditioning system 17 by means of the blower 20.

Of course, it is to be understood that any other suitable means for distributing the air in the interior of the car may be employed, but preferably the air distribution is in the manner described and disclosed herein.

In the operation of the system the blowers 20 and 30 are operated at full capacity, and the air from the interior of the car is drawn into the duct 23 as previously described, and hence is forced by the blower 20 into the chamber 18. Within this chamber, the air is heated by passing over the resistance coils of the electrical driving mechanism and, assuming operation under cold weather conditions, this air is passed into the common passageway 28, the dampers 35 and 38 being closed. Inasmuch as the blower 20 has only three-quarters of the capacity of the blower 30, additional air must be admitted to the blower 30, and this air is supplied from the duct 13 through the duct 16 and the aperture 36 into the inlet 29 of the blower 30.

From the blower 30 the air is discharged from the duct 33 and the longitudinal ducts 34 at the sides of the car out through the grills 50 into the interior of the car adjacent the feet of the passengers. The thermally responsive mechanism 43, as the car heats up, moves the arm 44 in a counter-clockwise direction as viewed in Figure 1, thereby actuating the link 40 to open the dampers 35 and 38. This results in a portion of the heated air from the chamber 18 being passed to exhaust through the opening 37, while additional amounts of fresh air are admitted through the opening 27 to compensate for this loss of heated air. The mechanism 43 thus controls the temperature of the air within the car, and may be located at any convenient point for this purpose.

During hot weather conditions when it is desired not to heat the air being forced into the car, the mechanism 43 operates to fully open the dampers 35 and 38 so that they lie in overlapping relationship, thereby closing the passageway 28 to the chamber 18. As a result, the heated air in the chamber 18 is discharged entirely through the exhaust port 37, and all of the air forced into the car is admitted through the duct 16 and opening 27 to the blower 30. Under such conditions no heating of the air is produced and the entire amount of air circulated within the car is fresh air.

During temperature conditions intermediate the extremes described above, the dampers 35 and 38 will occupy intermediate positions, depending upon the amount of heated air necessary to maintain the desired temperature within the car.

It is therefore believed apparent that I have provided a simplified type of air conditioning system for use in rail cars of this type, which is easily controllable from a single actuating member, and which prevents any infiltration of air into the car during normal operation.

I am aware that various changes may be made in certain of the details shown and described herein, and I therefore do not intend to be limited except as defined by the scope and spirit of the appended claims.

I claim:

1. An air conditioning system for an electrically driven vehicle having resistors beneath the floor of the vehicle, comprising a chamber enclosing said resistors, air withdrawing means communicating with the interior of the vehicle for exhausting air from said interior at a predetermined rate and forcing said air into said chamber, a fresh air supply duct beneath the vehicles having an outlet port communicating with said chamber, air input means communicating with the interior of the vehicle for drawing air from said chamber and from said fresh air supply duct and forcing it into said vehicle at a greater rate than it is exhausted from the interior of said vehicle by said air withdrawing means, said fresh air supply duct having inlets at opposite sides of the vehicle, said outlet port from said supply duct communicating with said air input means posterior to said chamber, and air regulating means for said outlet port controllable to supply sufficient air to make up the difference in rate of said air input means and said exhaust means.

2. An air conditioning system for a car body having heating means below the floor thereof and having longitudinal ducts at opposite sides of the car body, comprising a chamber enclosing said heating means, discharge means at one side of said chamber including a blower for withdrawing air from one of said ducts and forcing it into said chamber, air input means at the opposite side of said chamber including a blower for withdrawing air from said chamber and forcing it under pressure into the other of said ducts, means in said last-named duct for distributing said air within the car body, port means providing for the exhausting of all of the air in said chamber to atmosphere, said input means having a greater capacity than said discharge means, and a transverse fresh air supply means connected to said input means posterior to said chamber for admitting sufficient air thereto to make up the difference in capacity of said blowers, said fresh air supply means having sufficient capacity to supply all the air required for said input means when said exhausting means is actuated.

3. An air conditioning system for a closed car body, having heating means therebeneath, said system comprising a chamber enclosing said heating means, exhaust means including a blower for withdrawing air from said body and forcing it into said chamber, inlet means including a blower of greater capacity than said exhaust blower for forcing air from said chamber into said body to maintain the same under pressure, a fresh air supply duct connected to the inlet means between said chamber and said second-named blower, a controllable damper having means therein when in closed position for insuring a minimum supply of fresh air from said duct to make up the difference in capacities of said blowers when all the air from said chamber is directed into said inlet means, a discharge port for said chamber having a damper, and means conjointly controlling said dampers responsive to temperatures within the car for controlling the proportions of fresh and chamber air drawn by said inlet means into the car body.

4. In combination, a heating chamber, an exhaust port at one end thereof, a fresh air inlet port in alinement with said exhaust port, dampers for said ports, an outlet between said dampers, a blower connected to said outlet, one of said dampers having a fixed aperture therein, and thermally responsive means for conjointly opening and closing said dampers, said dampers being so constructed and arranged that opening of said dampers discharges air from said chamber through said exhaust port and admits air from said fresh air inlet port into said outlet.

5. The combination of claim 4 wherein said inlet port damper has the fixed aperture so that at least some fresh air will be drawn into said outlet through said inlet port irrespective of the position of said damper.

6. The combination of claim 4 wherein said dampers are connected to swing open conjointly into overlapping relation to close off said chamber from said blower.

7. Air conditioning means for a car body, comprising longitudinal ducts at the sides of the car body, vertical ducts in said body communicating at their lower end with one of said longitudinal ducts, and open to the interior of the car body thereabove, laterally directed outlet ports in the other longitudinal duct, means beneath the car body for withdrawing air from said first longitudinal duct at a predetermined rate, means beneath the car body for tempering said withdrawn air, means beneath the car body for forcing said tempered air into said other longitudinal duct at a rate greater than said predetermined rate, and means for supplying fresh air to said last-named means posterior to said tempering means in an amount sufficient to supply the deficiency caused by said difference in rates.

8. In a car body air conditioning system, means including a blower at one side of said body for exhausting air from said body at a predetermined rate, means at the opposite side of said body for introducing air into the body at a greater rate than said exhausting means, electrically heated resistors beneath the body, a chamber enclosing said resistors and connected to said exhaust means for receiving air therefrom and cooling the resistors, an outlet duct connected between said chamber and said introducing means, a fresh air inlet duct connected to said outlet duct intermediate the ends thereof, a damper for said fresh air inlet duct pivoted to swing into a position partially blocking the outlet duct adjacent said chamber connection and anterior to the connection of said fresh air inlet duct, a vent opening in said outlet duct alined with and opposite said fresh air inlet duct, a damper for said vent opening pivoted to swing into a position anterior to said fresh air inlet duct to cooperate with said inlet damper to completely block said outlet duct anterior to said fresh air inlet duct connection and vent all the chamber air to atmosphere, and means connecting said dampers for conjoint movement.

9. The system of claim 8 wherein said inlet damper is apertured to provide for passage of air into said outlet in a quantity sufficient to make up the deficiency caused by the said difference in rates when said inlet damper and vent damper are both completely closed.

10. In an air conditioning system for a car body, a chamber beneath the car body enclosing electrically heated resistors, a blower connected to said chamber for forcing air withdrawn from said body into the chamber, an outlet duct connected to said chamber, a blower in said outlet duct and spaced from the chamber for forcing air from the outlet duct into the car body, a fresh air supply duct alined ports in said outlet duct intermediate said chamber and blower, one of said ports constituting a vent to atmosphere and the other opening into said fresh air supply duct, interconnected dampers for said ports swingable into the outlet duct to block the same diagonally between the outlet blower side of the vent port and the chamber side of said fresh air inlet port in such manner as to vent all air from the chamber to atmosphere and supply only fresh air from said fresh air supply duct through its port to said blower, whereby said chamber air acts only to cool said resistors, and means responsive to temperatures in said car body for moving said dampers from blocking position through intermediate positions to port closing positions whereby varying portions of the chamber air can be used for tempering the fresh air supplied to said outlet blower.

11. In a vehicle body air conditioning system, a heating chamber for receiving air from the interior of the body, a duct forming an outlet for said chamber, blower means for drawing air from said outlet duct and forcing it under pressure into said body, means defining a vent opening in said outlet duct, damper means controlling said vent opening and in one position closing said chamber to said blower means and opening it to atmosphere through said vent opening, a fresh air inlet duct connected to said outlet duct adjacent said vent, and a damper for said inlet duct apertured to provide a predetermined minimum supply of fresh air to said blower means at all times and cooperating with said damper means in said one position to supply only fresh air to said blower means.

12. The system of claim 11 further characterized in the provision of means interconnecting said damper and damper means for conjoint movement.

ALFRED O. WILLIAMS.